United States Patent [19]
Abernethy

[11] Patent Number: 5,826,830
[45] Date of Patent: Oct. 27, 1998

[54] DUAL-HALF SYSTEM, FULL TORQUE REACTION CONTROL THRUSTER CONFIGURATION FOR THREE-AXIS STABILIZED SPACECRAFT

[75] Inventor: David K. Abernethy, Los Angeles, Calif.

[73] Assignee: Hughes Electronics Corporation, El Segundo, Calif.

[21] Appl. No.: 577,594

[22] Filed: Dec. 22, 1995

[51] Int. Cl.$^6$ .................................................. B64G 1/26
[52] U.S. Cl. ............................................ 244/169; 244/172
[58] Field of Search ................................ 244/158 R, 169, 244/172

[56] References Cited

U.S. PATENT DOCUMENTS

| | | | |
|---|---|---|---|
| 3,231,223 | 1/1966 | Upper . | |
| 3,907,226 | 9/1975 | Neufeld et al. | 244/169 |
| 4,288,051 | 9/1981 | Goschel | 244/169 |
| 4,848,706 | 7/1989 | Garg et al. . | |
| 4,991,393 | 2/1991 | Otten et al. . | |
| 5,255,878 | 10/1993 | Rahn | 244/169 |
| 5,263,666 | 11/1993 | Hubert et al. | 244/169 |
| 5,294,079 | 3/1994 | Draznin et al. . | |
| 5,335,179 | 8/1994 | Boka et al. | 366/459 |
| 5,395,076 | 3/1995 | Lichtin et al. | 244/169 |
| 5,400,252 | 3/1995 | Kazimi et al. | 244/169 |

FOREIGN PATENT DOCUMENTS

| | | |
|---|---|---|
| 0 604 214 A2 | 6/1994 | European Pat. Off. . |
| 0 654 403 A1 | 5/1995 | European Pat. Off. . |
| 5139394 | 6/1993 | Japan ..................... 244/169 |

OTHER PUBLICATIONS

Ishizawa et al., "MOS–1 Attitude and Orbit Control System", Control Science and Technology For the Progress Of Society, vol. 4, 24–28 Aug. 1981, Kyoto, Japan, pp. 2455–2460.

*Primary Examiner*—Robert J. Oberleitner
*Assistant Examiner*—Tien Dinh
*Attorney, Agent, or Firm*—Elizabeth E. Leitereg; Terje Gudmestad; Michael W. Sales

[57] ABSTRACT

A spacecraft with a spacecraft body having a first axis of symmetry, X, a second axis of symmetry, Y, and a third axis of symmetry, Z. The spacecraft has four thrusters. A control system is provided on the spacecraft which is in electrical contact with the first, second, third and fourth thrusters and which controls the activation and deactivation of the first, second, third and fourth thrusters so that the attitude and orbital velocity of the spacecraft can be controlled only by the first, second, third and fourth thrusters.

19 Claims, 3 Drawing Sheets

DUAL-HALF SYSTEM, FULL TORQUE REACTION CONTROL THRUSTER CONFIGURATION FOR THREE-AXIS STABILIZED SPACECRAFT

BACKGROUND OF THE INVENTION

In the past, geosynchronous satellites used thruster configurations which required East/West and/or North/South stationkeeping. Stationkeeping is understood in the art to be the process of maneuvering a satellite so that it remains in a predetermined and desired orbit about a planetary object, such as the Earth. For example, some current satellites, including the Space Systems Loral Intelsat VII, and Hughes HS 601 use twelve thrusters to achieve torque about all axes, and to achieve delta-V corrections in the East/West and North/South directions. The thrusters usually are of a chemical propellant type which ignites a chemical fuel so that the ignited fuel is expelled at such a rate that a sufficient force or thrust is produced to move the satellite. For East-West stationkeeping, thrust is generated to control the East and West position of the satellite where the East and West directions are defined from the X-axis of the spacecraft when the Z-axis points towards the Earth. Similarly, North/South stationkeeping pertains to using the thrusters to control the position of the satellite in the North and South directions along the Y-axis of the satellite. Thrusters are able to control the amount the velocity is to be altered which is commonly called controlling the delta V of the satellite.

Although many of the known geostationary satellites have performed adequately, there are, of course, still areas that could use improvement. For example, known spacecraft do not provide an efficient and economical thruster arrangement that produces torque of any sign about any of the spacecraft's three axes in a manner that is efficient, economical, and reduces the potential for interference.

SUMMARY OF THE INVENTION

The present invention provides a dual-half system, full torque reaction control thruster configuration for a three-axis spacecraft. The thruster configuration of the present invention is capable of producing torque of any sign about any of the three spacecraft axes in a manner that is efficient, economical, and reduces the potential for interference.

More particularly, the present invention concerns a spacecraft with a spacecraft body having a first axis of symmetry, X, a second axis of symmetry, Y, and a third axis of symmetry, Z. The spacecraft has four thrusters. A control system is provided on the spacecraft in electrical contact with first, second, third and fourth thrusters. The control system controls the activation and deactivation of the first, second, third and fourth thrusters so that the attitude and orbital velocity of the spacecraft can be controlled only by the first, second, third and fourth thrusters.

Another aspect of the present invention concerns a method of controlling the attitude and orbital velocity of a spacecraft which has a spacecraft body having a first axis of symmetry, X, a second axis of symmetry, Y, and a third axis of symmetry, Z. The method entails aligning four thrusters. Two or more of the first, second, third and fourth thrusters are simultaneously activated so that the attitude and orbital velocity of the spacecraft can be controlled only by the activated thrusters.

Another aspect of the present invention is a spacecraft with a spacecraft body having a first axis of symmetry, X, a second axis of symmetry, Y, and a third axis of symmetry, Z. The spacecraft body further includes a pair of thruster arrays, with each array having four thrusters. The spacecraft also has a control system in electrical contact with the first and second thruster arrays and which controls the activation and deactivation of the first and second thruster arrays so that the first and second thrusters can be activated separately or in tandem.

A fourth aspect of the present invention is a method of controlling the attitude and orbital velocity of a spacecraft which has a spacecraft body having a first axis of symmetry, X, a second axis of symmetry, Y, and a third axis of symmetry, Z. The method entails aligning a first and a second array of thrusters, and activating the first and second array of thrusters either separately or in tandem. The activated thrusters are controlled so that they control the attitude and orbital velocity of the spacecraft.

Thus, the above-described thruster configuration of the present invention provides an efficient and economical system for producing torques of any sign about any of the three axes of the spacecraft. The disclosed system also provides a method of backing up a main orbit-raising thruster should it fail. The disclosed system further provides a method of backing up a failed thruster configuration which generates torques of any sign about any of the three axes of the spacecraft. In addition, the present invention allows efficient control of the Z-axis torque and can alleviate any interference between the thrusters and the payload components of a spacecraft.

The foregoing features and advantages of the present invention will be further understood upon consideration of the following detailed description of the invention taken in conjunction with the accompanying drawings, in which:

DESCRIPTION OF THE PREFERRED EMBODIMENT

Figure 1:
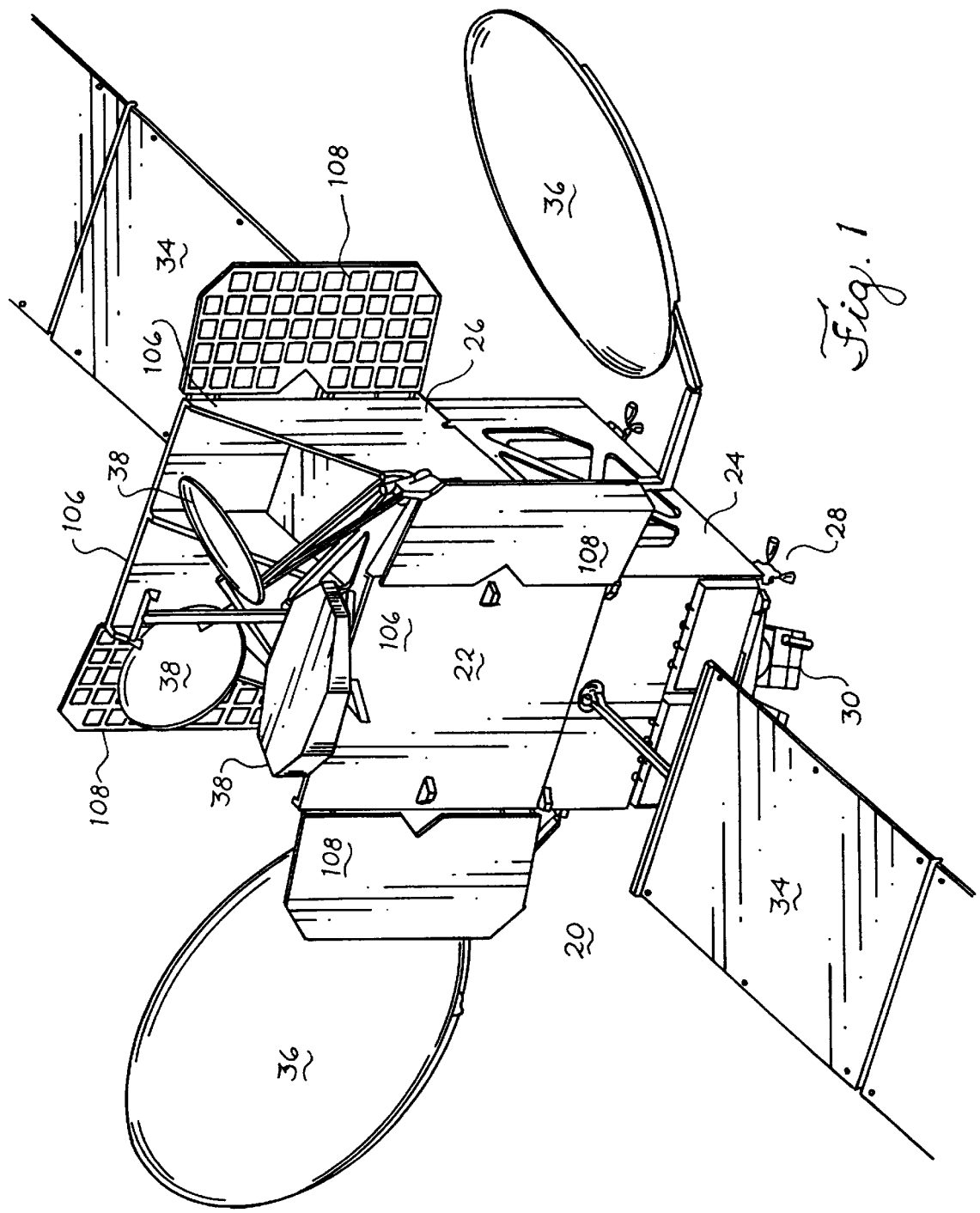
FIG. 1 shows a spacecraft capable of utilizing the redundant thruster configuration of the present invention.
Figure 2:
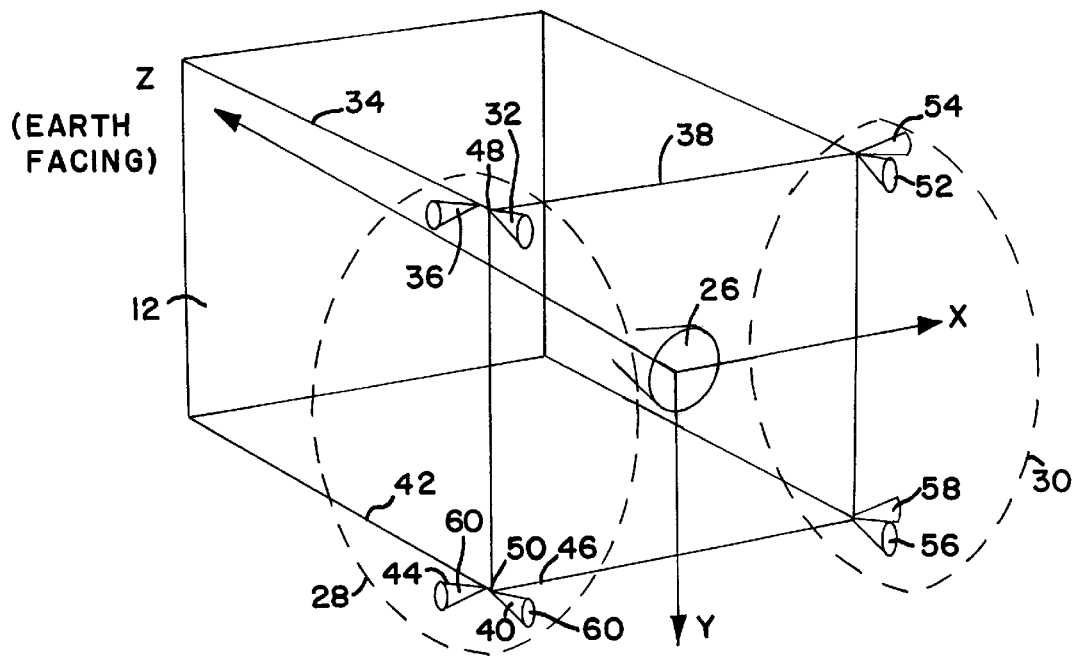
FIG. 2 schematically shows a thruster configuration to be used with the spacecraft of FIG. 1 according to the present invention.

A spacecraft or satellite 10 employing the present invention is shown in FIGS. 1–2 where like elements are denoted by like numerals. Satellite 10 has a spacecraft body 12 which includes a lower bus module 14 and an upper payload module 16. Attached to the aft end of the lower bus module 14 are a plurality of engines which will be discussed in detail later. Lower bus module 14 contains fuel tanks (not shown) and various power and control modules which operate the engines and power the payload module 16. Bus module 14 further includes a pair of solar panels 18 which convert sunlight into electricity which is sent to batteries (not shown) located on the bus module 14. Bus module 14 also has a number of receivers, such as antennae 20 and reflectors 22, which receive signals from a ground station on Earth which are used to control the satellite. Antennae 20 also send signals to the ground station.

Payload module 16 is attached to the bus module 14 and contains a variety of electronic equipment which may contain a number of sensors (not shown). The electronic equipment processes information gathered by the sensors and sends the processed information back to the ground station via antennae 20. Payload module 16 further includes heat radiators 24 which emit heat generated by the satellite 10.

In FIG. 2, spacecraft body 12 is shown schematically to have a first axis of symmetry, X, a second axis of symmetry, Y, and a third axis of symmetry, Z, wherein the center of mass of the spacecraft 10 preferably lies on or near the Z-axis. The spacecraft body 12 may have a main orbit raising thruster 26, such as a non-reaction control thruster which is sometimes called a Liquid Apogee Motor (LAM). Thruster 26 is typically attached to and centrally located on the aft part of the spacecraft body 12.

Spacecraft body 12 has a pair of thruster arrays or systems 28, 30 (see dashed lines) where each thruster array has four thrusters attached to the spacecraft body 12. Preferably, each thruster array is located at the aft end of spacecraft body 12 so that they do not interfere with any payload components (not shown) located at the opposite end of the spacecraft body 12.

In thruster array 28, there are four thrusters where one thruster 32 is aligned along a first line 34 parallel to the Z-axis and a second thruster 36 is aligned along a first line 38 parallel to the X-axis. The third thruster 40 of thruster array 28 is aligned along a second line 42 parallel to the Z-axis. The fourth thruster 44 of thruster array 28 is aligned along a second line 46 parallel to the X-axis. For thrusters 32 and 36, lines 34 and 38 intersect one another at a first point of intersection 48. Likewise, lines 34 and 38 intersect one another at a second point of intersection 50. Preferably, the first and second points of intersection 48, 50 lie in a plane defined by the X and Y-axes. The points of intersection 48, 50 are separated from each other by approximately 100" and lie along a line parallel to the Y-axis. The separation is of course dependent on the particular geometry of the spacecraft 10 and the desired torques to be produced. Note that one or more of the thrusters may not be aligned with the X, Y and Z-axes.

As shown in FIG. 2, the second thruster array 30 also has four thrusters 52, 54, 56 and 58 which are preferably arranged symmetrically to thrusters 32, 36, 40 and 44, respectively, with respect to a plane at or near the Y-Z plane. Thrusters 52 and 56 are aligned along lines parallel to the Z-axis and thrusters 54 and 58 are aligned along lines parallel to the X-axis.

Each of the four thrusters for the two thruster arrays 28, 30 preferably is a chemical thruster 60, such as a monopropellant or a bipropellant thruster. Each of the eight thrusters are either fixed to the spacecraft body 12 or attached thereto via a gimballed mechanism so the thruster can move relative to the body 12.

Figure 3:
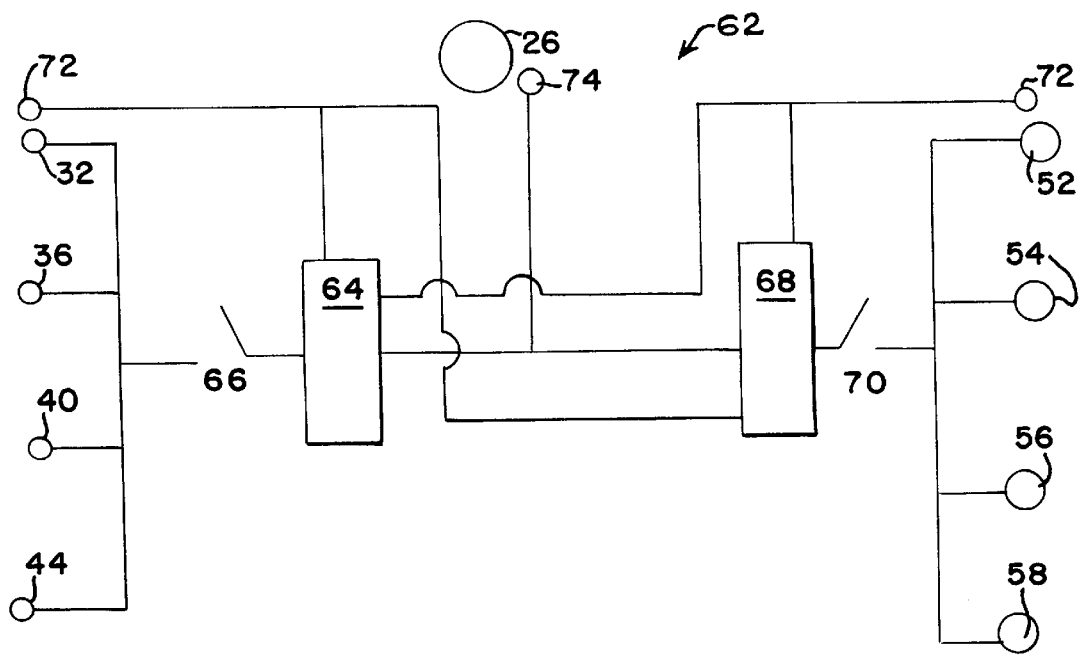
FIG. 3 schematically shows a control system for the redundant thruster configuration of FIG. 1.

As shown in FIG. 3, each of the thrusters and thruster arrays are in electrical contact with a control system 62. In particular, control system 62 has a first processor 64 electrically connected to thruster array 28 via a first switch 66. The first processor 64 controls the activation and deactivation of thrusters 32, 36, 40 and 44. Control system 62 also includes a second processor 68 which controls the activation and deactivation of thrusters 52, 54, 56 and 58. As with processor 64, the second processor 68 is electrically connected to the second thruster array 30 via a switch 70.

Figure 4:
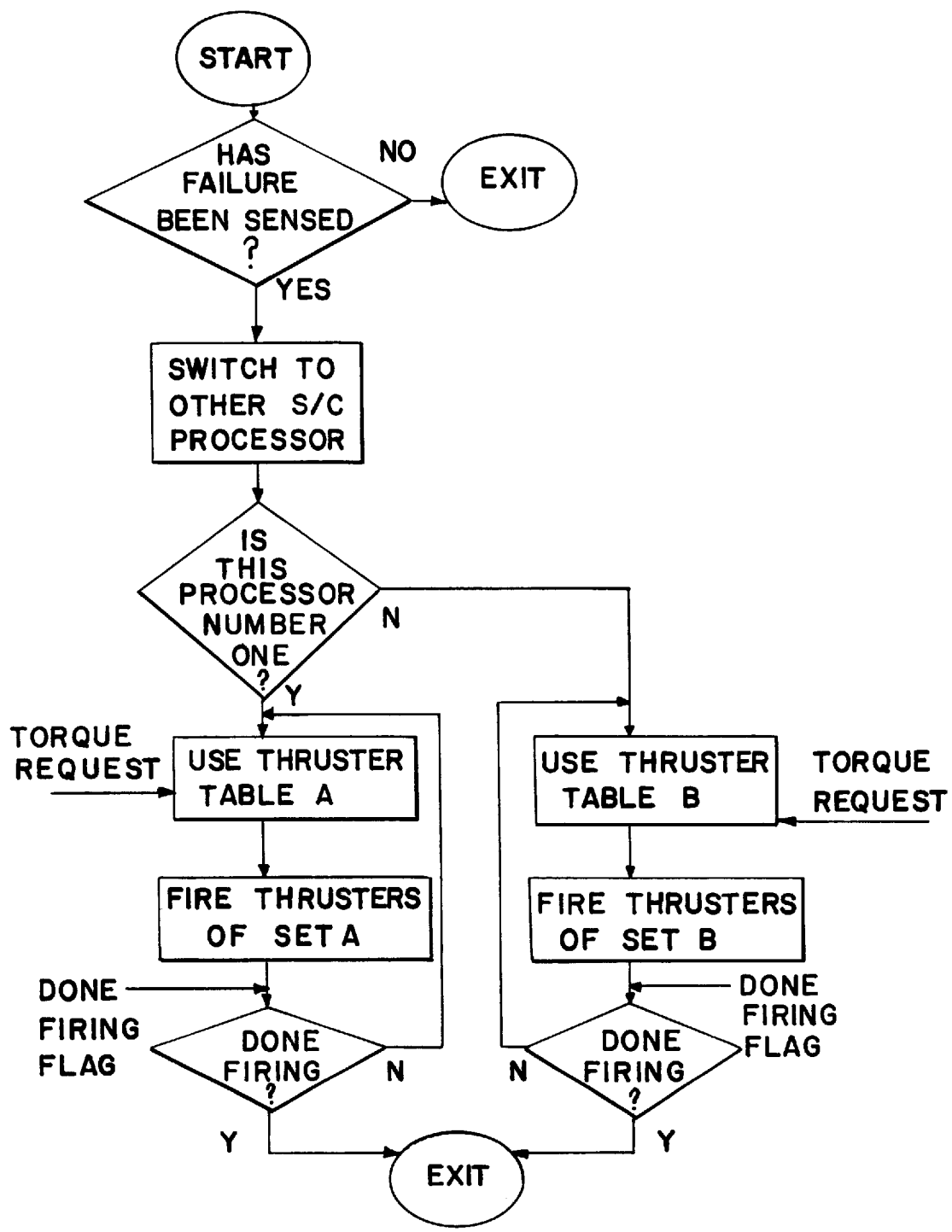
FIG. 4 shows a flow chart of a procedure used to control the activation of a half-system of thrusters.

Initially, switch 66 is in a closed position and switch 70 is in an open position so that control of the attitude and the orbital velocity of the spacecraft 10 is performed by the first thruster array 28. One or more sensors 72 are employed in a well known manner to determine if one of the four thrusters of thruster arrays 28 or 30 is inactive or has failed during activation. Processors 64 and 68 are each in communication with sensors 72. As shown in FIG. 4, if a failure is found in thruster array 28 by the sensors 72, a signal is sent to processor 64 which then sends a signal which opens switch 66. Sensors 72 also send a signal to processor 68 and closes switch 70 so that attitude and orbital velocity are controlled by the second thruster array 30.

The above-described switching structure allows the spacecraft 10 to have a redundant "half-system" or thruster array system where only one thruster array is used to control the attitude and orbital velocity of the spacecraft 10. If the activated thruster array fails, then the second thruster array can be activated to take over the functions of attitude and orbital velocity control.

When either the first or the second thruster array is activated, the processor 64, 68 for that activated thruster array controls the activation and deactivation of the four thrusters of the thruster array so that the attitude and orbital velocity of the spacecraft are only controlled by them. For example, if processor 64 is activated and a positive torque or roll about the X axis (+X) is desired, then processor 64 simultaneously activates only three (36, 40, 44) of the four thrusters in the thruster array. If processor 64 is activated and a positive torque or pitch about the Y axis (+Y) is desired then only two (32, 40) of the four thrusters in the thruster array need to be activated simultaneously by processor 64. The process is similar for the second thruster array when processor 68 is activated and processor 64 is deactivated. A table showing the thrusters to be activated for a particular torque is given below:

| Type of Torque Desired | Thrusters Activated in Thruster Array 28 | Thrusters Activated in Thruster Array 30 |
| --- | --- | --- |
| +Roll (+X) | 36, 40, 44 | 54, 56, 58 |
| −Roll (−X) | 32, 36, 44 | 52, 54, 58 |
| +Pitch (+Y) | 32, 40 | 54, 58 |
| −Pitch (−Y) | 36, 44 | 52, 56 |
| +Yaw (+Z) | 32, 36, 40 | 52, 56, 58 |
| −Yaw (−Z) | 32, 40, 44 | 52, 54, 56 |

Besides providing a redundant thruster system between themselves, thruster arrays 28 and 30 can be used to overcome a failure in the main orbit raising thruster 26. If such a situation occurs, then both thruster arrays 28 and 30 are required to be activated to provide the necessary attitude and orbital velocity control usually provided by thruster 26. In this case, a sensor 74 senses whether thruster 26 has failed. If it has, a signal is sent to microprocessors 64 and 68, which then activate thruster arrays 28 and 30 in tandem by closing both switches 66 and 68. Once the processors 64 and 68 are aware that both thruster arrays are to be used, they each use a thruster control program for their corresponding thruster array which takes into account that the other thruster array is activated as well. In this case, only thruster 40 from the first thruster array 28 and thruster 56 from the second thruster array 30 are simultaneously activated to generate a positive torque or roll about the X-axis. Should a positive torque or pitch about the Y-axis be desired, then only thrusters 32 and 40 from the first thruster array 28 and thrusters 54 and 58 from the second thruster array 30 are simultaneously activated. A table showing the thrusters to be activated simultaneously in both thruster arrays 28 and 30 for a particular torque is given below:

| Type of Torque Desired | Thrusters Activated in Thruster Arrays 28 and 30 |
| --- | --- |
| +Roll (+X) | 40, 56 |
| −Roll (−X) | 32, 52 |
| +Pitch (+Y) | 32, 40, 54, 58 |
| −Pitch (−Y) | 36, 44, 52, 56 |
| +Yaw (+Z) | 36, 58 |
| −Yaw (−Z) | 44, 54 |

In summary, the present invention provides an efficient and economical system for producing torques of any sign about any of the three axes of the spacecraft. The present invention also can be used to back up either a main orbit-raising thruster or thruster configuration should either fail. In addition, the present invention efficiently controls the Z-axis torque and alleviates any interference between the thrusters and the payload components of a spacecraft.

The foregoing description is provided to illustrate the invention, and is not to be construed as a limitation. Numerous additions, substitutions and other changes can be made to the invention without departing from its scope as set forth in the appended claims.

I claim:

1. A three axis body stabilized spacecraft comprising:
    a spacecraft body having a first axis of symmetry, X, a second axis of symmetry, Y, and a third axis of symmetry, Z;
    a first thruster aligned along a first line parallel to said Z-axis;
    a second thruster aligned along a first line parallel to said X-axis;
    a third thruster aligned along a second line parallel to said Z-axis;
    a fourth thruster aligned along a second line parallel to said X-axis,
    wherein said first, second, third, and fourth aligned thrusters provide thrust and positive and negative torque about each of said X, Y and Z axes, and
    wherein said first, second, third and fourth thrusters are located only at an aft end of said spacecraft body; and
    a control system in electrical contact with said first, second, third and fourth thrusters, wherein said control system controls the activation and deactivation of said first, second, third and fourth thrusters so that the attitude and orbital velocity of said spacecraft can be controlled by the torque and thrust of only said first, second, third and fourth thrusters wherein said first line parallel to said Z-axis and said first line parallel to said X-axis intersect one another at a first point of intersection.

2. The spacecraft of claim 1, wherein each of said first, second, third and fourth thrusters comprises a chemical thruster.

3. The spacecraft of claim 2, wherein said chemical thruster is a monopropellant thruster.

4. The spacecraft of claim 2, wherein said chemical thruster is a bipropellant thruster.

5. The spacecraft of claim 1, wherein
    said second line parallel to said Z-axis and said second line parallel to said X-axis intersect one another at a second point of intersection.

6. The spacecraft of claim 5, wherein said first and second points of intersection lie in a plane defined by the X and Y-axes.

7. The spacecraft of claim 6, wherein the center of mass of said spacecraft lies near said Z-axis.

8. The spacecraft of claim 1, wherein said control system activates only three of said first, second, third and fourth thrusters to generate a torque about the X or Z axes.

9. The spacecraft of claim 1, wherein said control system activates only two of said first, second, third and fourth thrusters to generate a torque about the Y axis.

10. A three axis body stabilized spacecraft comprising:
    a spacecraft body having a first axis of symmetry, X, a second axis of symmetry, Y, and a third axis of symmetry, Z;
    a first thruster array comprising:
        a first thruster of said first thruster array aligned along a first line parallel to said Z-axis;
        a second thruster of said first thruster array aligned along a first line parallel to said X-axis;
        a third thruster of said first thruster array aligned along a second line parallel to said Z-axis;
        a fourth thruster of said first thruster array aligned along a second line parallel to said X-axis;
    a second thruster array comprising:
        a first thruster of said second thruster array aligned along a first line parallel to said Z-axis;
        a second thruster of said second thruster array aligned along a first line parallel to said X-axis;
        a third thruster of said second thruster array aligned along a second line parallel to said Z-axis;
        a fourth thruster of said second thruster array aligned along a second line parallel to said X-axis, and
        wherein said first, second, third, and fourth thrusters of each said first and said second thruster arrays provide thrust and positive and negative torque about each of said X, Y and Z axes, and
        wherein said first thruster array and said second thruster array are located only at an aft end of said spacecraft body: and
    a control system in electrical contact with said first and second thruster arrays, wherein said control system controls the activation and deactivation of said first and second thruster arrays so that the four thrusters of each said first and second thruster arrays can be activated separately or in tandem to provide all said torque and thrust necessary to control the attitude and orbital velocity of the spacecraft.

11. The spacecraft of claim 10, wherein when said control system activates one of said thruster arrays and deactivates the other of said thruster arrays, said control system controls the activation and deactivation of said first, second, third and fourth thrusters of said activated thruster array so that the attitude and orbital velocity can be controlled only by said first, second, third and fourth thrusters of said activated thruster array.

12. The spacecraft of claim 10, wherein when said control system activates each of said first and second thruster arrays, said control system activates only one thruster from each thruster array to generate a torque about the X or Z axes.

13. The spacecraft of claim 10, wherein when said control system activates each of said first and second thruster arrays, said control system activates only two thrusters from each thruster array to generate a torque about the Y axis.

14. The spacecraft of claim 10, wherein said control system comprises:
    a first processor electrically connected to said first thruster array via a first switch, said first processor controlling the activation of said first, second, third and fourth thrusters of said first thruster array;

a second processor electrically connected to said second thruster array via a second switch, said second processor controlling the activation of said first, second, third and fourth thrusters of said second thruster array, wherein said first switch is in a closed position and said second switch is in an open position;

a sensor to determine if one of said first, second, third and fourth thrusters of said first thruster array has failed during activation;

if a failure is found by said sensor, said first switch is opened and said second switch is closed.

15. A method of controlling the attitude and orbital velocity of a three axis body stabilized spacecraft which has a spacecraft body having a first axis of symmetry, X, a second axis of symmetry, Y, and a third axis of symmetry, Z, said method comprising the steps of:

aligning a first thruster along a first line parallel to said Z-axis;

aligning a second thruster along a first line parallel to said X-axis;

aligning a third thruster along a second line parallel to said Z-axis;

aligning a fourth thruster along a second line parallel to said X-axis, wherein said first, second, third, and fourth aligned thrusters provide thrust and positive and negative torque about each of said X, Y and Z axes, and wherein said first, second, third and fourth aligned thrusters are located only at an aft end of said spacecraft body; and activating simultaneously two or more of said first, second, third and fourth aligned thrusters so that the attitude and orbital velocity of the spacecraft can be controlled by said torque and thrust of only said activated thrusters.

16. The method of claim 15, wherein said activation step comprises activating only three of said first, second, third and fourth thrusters to generate a torque about the X or Z axes.

17. The method of claim 15, wherein said activation step comprises activating only two of said first, second, third and fourth thrusters to generate a torque about the Y axis.

18. A method of controlling the attitude and orbital velocity of a three axis body stabilized spacecraft which has a spacecraft body having a first axis of symmetry, X, a second axis of symmetry, Y, and a third axis of symmetry, Z, said method comprising the steps of:

aligning a first array of thrusters, comprising the steps of:
aligning a first thruster along a first line parallel to said Z-axis;
aligning a second thruster along a first line parallel to said X-axis;
aligning a third thruster along a second line parallel to said Z-axis;
aligning a fourth thruster along a second line parallel to said X-axis;

aligning a second array of thrusters, comprising the steps of:
aligning a first thruster along a first line parallel to said Z-axis;
aligning a second thruster along a first line parallel to said X-axis;
aligning a third thruster along a second line parallel to said Z-axis;
aligning a fourth thruster along a second line parallel to said X-axis, wherein each of said first, second, third, and fourth aligned thrusters of each thruster array provide thrust and positive and negative torque about each of said X, Y and Z axes, and wherein said first and second arrays are located only at an aft end of said spacecraft body;

activating said first and second array of thrusters either separately or in tandem; and controlling the attitude and orbital velocity of said spacecraft with said torque and thrust from the four thrusters of each said activated first and second thruster arrays.

19. The method of claim 18, further comprising the steps of:

activating said first array of thrusters and deactivating said second array of thrusters;

sensing if a thruster in said first array of thrusters has failed;

activating said second array of thrusters and deactivating said first array of thrusters if a failed thruster is detected.

* * * * *